(12) United States Patent
Guo

(10) Patent No.: US 11,528,052 B2
(45) Date of Patent: Dec. 13, 2022

(54) DATA TRANSMISSION METHOD, FIRST CHIP, ELECTRONIC DEVICE AND STORAGE MEDIUM

(71) Applicant: Shenzhen Goodix Technology Co., Ltd., Guangdong (CN)

(72) Inventor: Shilin Guo, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/476,474

(22) Filed: Sep. 15, 2021

(65) Prior Publication Data

US 2022/0231724 A1 Jul. 21, 2022

(30) Foreign Application Priority Data

Jan. 19, 2021 (CN) .......................... 202110066505.8

(51) Int. Cl.
*H04B 1/713* (2011.01)
*H04W 4/80* (2018.01)

(52) U.S. Cl.
CPC .............. *H04B 1/713* (2013.01); *H04W 4/80* (2018.02)

(58) Field of Classification Search
CPC .......... H04B 1/713; H04B 2201/71323; H04B 1/7143; H04B 1/715; H04B 2001/7154;
(Continued)

(56) References Cited

U.S. PATENT DOCUMENTS

2002/0183087 A1* 12/2002 Spencer ................. H04B 7/082
455/82
2007/0206660 A1 9/2007 Lifchuk et al.
(Continued)

FOREIGN PATENT DOCUMENTS

CN 103888891 A 6/2014
CN 204859208 U 12/2015
(Continued)

OTHER PUBLICATIONS

Shenzhen Goodix Technology Co., Ltd., International Search Report, PCT/CN2021/072627, dated Oct. 26, 2021, 4 pgs.
(Continued)

*Primary Examiner* — Sung S Ahn
(74) *Attorney, Agent, or Firm* — USCH Law, PC

(57) ABSTRACT

A data transmission method, a first chip, an electronic device, and a storage medium are provided. Data transmission of the first chip with a second chip is performed in one of a standard working mode based on a standard Bluetooth protocol and a non-standard working mode including at least one of: a first working mode in which data is transmitted with the second chip in a designated first fixed channel of the standard channels; a second working mode in which data is transmitted with the second chip by frequency hopping among extended extension channels; a third working mode in which data is transmitted with the second chip in a designated second fixed channel of the extended extension channels; and a fourth working mode in which data is transmitted with the second chip by frequency hopping among the standard channels and the extended extension channels.

18 Claims, 6 Drawing Sheets

(58) Field of Classification Search
CPC ...... H04B 17/382; H04W 4/80; H04W 12/02; H04W 12/50; H04W 12/0471; Y02D 30/70; H04L 1/0015
See application file for complete search history.

(56) References Cited

U.S. PATENT DOCUMENTS

| | | | | |
|---|---|---|---|---|
| 2008/0310557 | A1* | 12/2008 | Gaikwad | H04L 7/046 375/340 |
| 2017/0215213 | A1 | 7/2017 | Lee et al. | |
| 2018/0199214 | A1 | 7/2018 | Shen | |
| 2020/0322965 | A1* | 10/2020 | Gan | H04B 1/7136 |

FOREIGN PATENT DOCUMENTS

| | | |
|---|---|---|
| CN | 205040032 U | 2/2016 |
| CN | 105430748 A | 3/2016 |
| CN | 105848161 A | 8/2016 |
| CN | 110677807 A | 1/2020 |
| CN | 111654845 A | 9/2020 |
| WO | 2018054372 A1 | 3/2018 |

OTHER PUBLICATIONS

Shenzhen Goodix Technology Co., Ltd., Extended European Search Report, EP 21195968.9, dated Feb. 18, 2022, 8 pgs.

Shenzhen Goodix Technology Co., Ltd., CN First Office Action, CN202110066505.8, dated Mar. 3, 2021, 7 pgs.

Shenzhen Goodix Technology Co., Ltd., CN Final Office Action, CN202110066505.8, dated Mar. 16, 2021, 4 pgs.

Martin Woolley, "Bluetooth Core Specification Version 5.2 Feature Overview," https://www.bluetooth.com/bluetooth-resources/bluetooth-core-specification-version-5-2-feature-overview/, Dec. 9, 2020, 37 pgs.

* cited by examiner

DATA TRANSMISSION METHOD, FIRST CHIP, ELECTRONIC DEVICE AND STORAGE MEDIUM

CROSS-REFERENCE TO RELATED APPLICATION

The application claims priority to Chinese Patent Application No. 202110066505.8, filed on Jan. 19, 2021, entitled "DATA TRANSMISSION METHOD, FIRST CHIP, ELECTRONIC DEVICE AND STORAGE MEDIUM," which is incorporated herein by reference in its entirety.

TECHNICAL FIELD

The present disclosure relates to the field of communication technology, in particular to a data transmission method, a first chip, an electronic device and a storage medium.

BACKGROUND

The current Bluetooth Low Energy (BLE) works in a frequency band of 2400 Mhz-2480 Mhz, specified by the standard Bluetooth protocol. Taking 2 Mhz as a step, the entire working frequency band is divided into 40 channels, among which data is transmitted by frequency hopping, which cannot meet requirements for data transmission in different scenarios.

SUMMARY

Some embodiments of the present disclosure aim to provide a data transmission method, a first chip, an electronic device, and a storage medium, which can meet requirements for data transmission in different scenarios while being compatible with the existing standard Bluetooth protocol.

Some embodiments of the present disclosure provide a data transmission method applicable to a first chip. Data transmission of the first chip with a second chip is performed in one of a standard working mode and a non-standard working mode. The standard working mode is a working mode in which data is transmitted between the first chip and the second chip by frequency hopping among standard channels based on a standard Bluetooth protocol. The non-standard working mode includes at least one of: a first working mode in which data is transmitted between the first chip and the second chip in a designated first fixed channel, the first fixed channel being one of the standard channels; a second working mode in which data is transmitted between the first chip and the second chip by frequency hopping among extended extension channels; a third working mode in which data is transmitted between the first chip and the second chip in a designated second fixed channel, the second fixed channel being one of the extended extension channels; and a fourth working mode in which data is transmitted between the first chip and the second chip by frequency hopping among the standard channels based on the standard Bluetooth protocol and the extended extension channels.

Some embodiments of the present disclosure further provide a first chip which is disposed within an electronic device and connected to a memory within the electronic device. The memory stores instructions executable by the first chip. The instructions, when executed by the first chip, causes the first chip to implement the aforementioned data transmission method.

Some embodiments of the present disclosure further provide an electronic device, including: the aforementioned first chip and a memory connected to the first chip.

Some embodiments of the present disclosure further provide a computer-readable storage medium that stores a computer program which, when executed by a processor, causing the processor to implement the aforementioned data transmission method.

In the embodiments of the present disclosure, data transmission of the first chip and the second chip is performed in the standard working mode and the non-standard working mode, that is, the first chip and the second chip may support different working modes, which meets requirements for data transmission in different scenarios. Since the standard working mode is a working mode in which data is transmitted between the first chip and the second chip by frequency hopping among standard channels based on the standard Bluetooth protocol, that is, the first chip and the second chip are compatible with the existing standard Bluetooth protocol while supporting other non-standard working mode, it is advantageous for widening the scope of application of the first chip and the second chip while meeting requirements for data transmission in different scenarios, so that the first chip and the second chip are widely applicable. The first working mode in which data is transmitted between the first chip and the second chip in a designated first fixed channel is advantageous for meeting a requirement for data transmission in a scenario where a certain channel needs to be customized for data transmission among the standard channels, and also advantageous for improving efficiency of data transmission. The second working mode in which data is transmitted between the first chip and the second chip by frequency hopping among the extended extension channels is advantageous for meeting a requirement for data transmission in a scenario where frequency hopping among the extension channels is required, and also advantageous for avoiding interference of a ISM frequency band that that is not needed to be authorized and is open to the three main institutions of Industrial, Scientific, Medical (ISM) by the International Telecommunications Union-Radio Communication Bureau, so as to improve stability of data transmission. The third working mode in which data is transmitted between the first chip and the second chip in a designated second fixed channel is advantageous for meeting a requirement for data transmission in a scenario where a certain channel needs to be customized for data transmission among the extension channels, and also advantageous for improving efficiency of data transmission while avoiding interference of the ISM frequency band to improve stability of data transmission. The fourth working mode in which data is transmitted between the first chip and the second chip by frequency hopping among the standard channels based on the standard Bluetooth protocol and the extended extension channel makes it possible to perform data transmission by frequency hopping among more channels (over forty), such that the range for frequency hopping is widened, and the load of data transmission on the standard channels may be shared by both the standard channels and the extension channels, thereby reducing the load of data transmission on each channel and improving efficiency of data transmission. With the amount of channels for data transmission increased, data transmission of more devices is allowed, and it is advantageous for meeting requirements for data transmission in a scenario that is covered with a high density of Bluetooth low energy networks.

In an embodiment, when the first chip is a chip sending a switching instruction, the method includes: sending the switching instruction to the second chip when a preset trigger condition is met, where the switching instruction carries the time point of switching and the target working mode, and the switching instruction is used to instruct the second chip to switch the current working mode of the second chip to the target working mode at the time point of switching; switching the current working mode of the first chip to the target working mode at the time point of switching. The current working mode and the target working mode are different from each other, and each is one of the standard working mode and the non-standard working mode. By sending the switching instruction, the first chip and the second chip are switched to the same working mode at the same time point, which is advantageous for meeting requirements for data transmission in different scenarios while enable accurate data transmission between the first chip and the second chip after the working mode is switched.

For example, the non-standard working mode includes the second working mode and/or the third working mode. The trigger condition includes: it is determined that the first chip is in a state where a Bluetooth connection has been established with the second chip and Bluetooth pairing has not been performed. The target working mode is the second working mode or the third working mode. During a process of Bluetooth pairing, the pairing parties exchange secret keys. Since the standard Bluetooth protocol is supported in most of current third-party listening devices, it is easy for them to monitor the standard frequency band specified by the standard Bluetooth protocol and thus steal the secret keys during the process of Bluetooth pairing. Therefore, in the embodiments of the present disclosure, before the Bluetooth pairing, the pairing parties switch the working mode, so that during the Bluetooth pairing, the pairing parties may communicate with each other in a frequency out of the standard frequency band based on the standard Bluetooth protocol. Either working in the second working mode or the third working mode, the first chip and the second chip does not use the standard frequency band based the standard Bluetooth protocol, which may avoid being monitored by the third-party listening devices, so as to prevent the secret keys from being stolen during the process of Bluetooth pairing and improve security during the process of pairing.

In an embodiment, the previous working mode before switching is the standard working mode or the first working mode. The extension frequency band is not an ISM frequency band that is not needed to be authorized and is opened to the three main institutions of industry, science, and medicine by the International Telecommunications Union-Radio Communication Bureau, and long-term occupation of the extension frequency band may cause waste of resources. Therefore, after the pairing is completed, restoring to the standard working mode or the first working mode that does not occupy the extended frequency band may improve safety of the pairing and reduce the waste of resources.

In an embodiment, the non-standard working mode includes at least one of: the second working mode, the third working mode, and the fourth working mode. The standard channels are obtained by dividing a standard frequency band, and the extension channels are obtained by dividing an extended extension frequency band. The standard frequency band has an upper limit frequency and a lower limit frequency, and the extended frequency band includes a first frequency band and a second frequency band. Frequencies in the first frequency band are all less than the lower limit frequency, and frequencies in the second frequency band are all greater than the upper limit frequency. With the upper limit frequency as a baseline, the communication quality may get worse as the frequency becomes larger. With the lower limit frequency as the baseline, the communication quality may get worse as the frequency becomes smaller. Therefore, in order to extend the same number of channels, compared with the scheme extending only one frequency band, the scheme of expanding the first frequency band and the second frequency band is advantageous for increasing the number of expanded channels while maintaining the communication quality in a relatively balanced level.

In an embodiment, the standard channels are numbered with continuous channel numbers including an initial number and an end number. Channel numbers of channels obtained by dividing the first frequency band are sequentially decreased based on the initial number as frequency decreases. Channel numbers of channels obtained by dividing the second frequency band are sequentially increased based on the end number as frequency increases. Considering that the standard channels in the related art already have consecutive channel numbers, in the embodiments of the present disclosure, the channel number of the standard channels and the extension channels may be made consecutive without renumbering the standard channels, which is convenient to adapting to the existing standard for channel numbering and improves operation efficiency and speed, that is, the channels after frequency hopping may be determined more quickly, thereby increasing the speed of data transmission between chips. Moreover, since the existing adaptive frequency hopping algorithm is performed under the condition of continuous numbering, the continuous numbering of the extension channels and the standard channels in the present disclosure is adaptable to the existing adaptive frequency hopping algorithm.

BRIEF DESCRIPTION OF THE DRAWINGS

One or more embodiments are exemplified by the figures in the corresponding drawings. These exemplified descriptions do not constitute a limitation on the embodiments. The elements with the same reference numerals in the drawings are denoted as similar elements. Unless otherwise stated, the figures in the drawings do not constitute a scale limitation.

DETAILED DESCRIPTION

Figure 1:
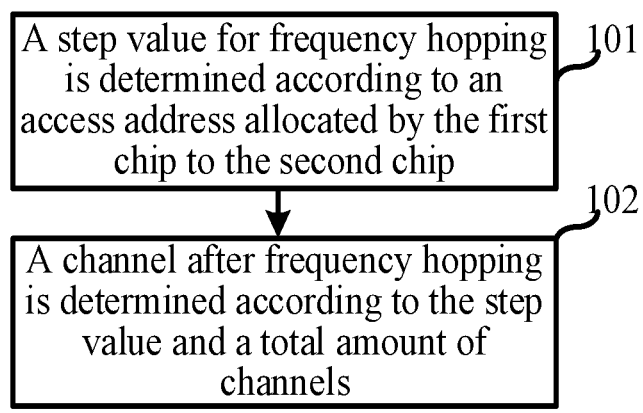
FIG. 1 is a flowchart of determining a channel after frequency hopping according to an embodiment of the present disclosure.

In order to make the objectives, technical solutions, and advantages of the present disclosure clearer, some embodiments of the present disclosure will be further described in detail below with reference to the accompanying drawings and embodiments. Those skilled in the art should appreciate that in various embodiments, many technical details are presented in order to enable the reader to better understand the present disclosure. However, even without these technical details and various changes and modifications based on the following embodiments, the technical solution claimed by the present disclosure can be implemented. The division of the following embodiments is for convenience of description, and should not constitute any limitation on the specific implementation of the present disclosure, and the various embodiments may be combined with and referenced to each other without contradiction.

Some embodiments of the present disclosure provide a data transmission method, which is applicable to the first chip. Data transmission in the embodiments of the present disclosure mainly refers to data transmission between the first chip and a second chip. Herein, the first chip is provided in a master device, and the second chip is provided in a slave device; or, the first chip is provided in the slave device, and the second chip is provided in the master device. That is to say, one of the first chip and the second chip is provided in the master device and the other is provided in the slave device. The data transmission between the first chip and the second chip may also be understood as data transmission between the master device and the slave device. Both the first chip and the second chip may be Bluetooth chips. The following specifically describes the implementation details of the data transmission method of the embodiments. The following content is only provided for ease of understanding and is not a must for the implementation of this solution.

In this embodiment, working modes supported by the first chip and the second chip during data transmission include a standard working mode and a non-standard working mode. In other words, the working modes of the first chip and the second chip include: the standard working mode and the non-standard working mode. The standard working mode and the non-standard working mode are described in detail below.

The standard working mode is a working mode in which data is transmitted between the first chip and the second chip by frequency hopping among standard channels based on the standard Bluetooth protocol. It should be appreciated that the standard frequency band of the current standard Bluetooth protocol is 2.4 G ISM frequency band, that is, 2400 Mhz-2480 Mhz, a total of 80 Mhz which is divided into forty standard channels by a width of 2 Mhz. The standard working mode may be understood as a working mode used in the current Bluetooth low energy technology, that is, the working mode of adaptive frequency hopping within the standard frequency band specified by the standard Bluetooth protocol, that is, the working mode of adaptive frequency hopping among the aforementioned forty standard channels. Herein, the adaptive frequency hopping means that the first chip and the second chip continuously update the communication channels used by both parties according to the same adaptive frequency hopping algorithm. The way of adaptive frequency hopping may be implemented based on the adaptive frequency hopping algorithm specified in the Bluetooth core protocol Core_v5.2, which is not specifically described in the embodiments.

The non-standard working mode is a working mode based on a customized private protocol, including any one or a combination of the following: a first working mode in which data is transmitted between the first chip and the second chip in a designated first fixed channel, where the first fixed channel is one of the standard channels; a second working mode in which data is transmitted between the first chip and the second chip by frequency hopping among the extended extension channels; a third working mode in which data is transmitted between the first chip and the second chip in a designated second fixed channel, where the second fixed channel is one of the extended extension channels; a fourth working mode in which data is transmitted between the first chip and the second chip by frequency hopping among the standard channels based on the standard Bluetooth protocol and the extended extension channels. The above four non-standard working modes are described in detail below.

In the first working mode, the first chip and the second chip transmit data in the designated first fixed channel, and the first fixed channel is one of the standard channels, that is, one of the aforementioned forty standard channels. The data transmission in the designated first fixed channel may be understood as "the first chip and the second chip transmit data in the first fixed channel for a preset period of time", that is, the channel for the data transmission shall not be altered in the preset period of time.

The applicable scenarios of the first working mode may include but are not limited to: within a preset region, the number of devices that need to transmit data is less than a preset number. Herein, the preset range and the preset number may be set according to actual needs. For example, the preset region may be within 5 meters or within a room. That is to say, in a scenario where there are a few devices within the preset region, channels may be designated to each device so that each device may transmit data in the designated channel. When there are only a few devices, forty standard channels are sufficient for designation, which improves efficiency of data transmission.

In an example, the first fixed channel may be selected by a person skilled in the art from a plurality of standard channels according to actual needs, which facilitates customization of the channel. For example, an application program interface (API) may be provided externally for the first chip and the second chip, so that a person skilled in the art may select a channel as the first fixed channel through the API.

In another example, the first fixed channel may also be uniformly allocated and designated by a central device according to a condition of connections between the devices, which realizes automatic and reasonable channel designation. For example, in multiple devices under the Bluetooth low energy network, one device may be pre-designated as the central device. The central device may be used to coordinate the allocation and use of the channels, and allocate channels for each device under the Bluetooth low energy network, so that there is no interference in data transmission between devices. For example, multiple devices under the Bluetooth low energy network include a central device and devices 1 to 8. The central device determines that Bluetooth connections of the device 1 with the devices 2, 3, and 4 has been established, respectively, that is, data transmission of the device 1 with the devices 2, 3, and 4 may be performed, respectively. The central device determines that Bluetooth connections of the device 5 with the devices 6, 7, and 8 has been established, respectively, that is, data transmission of the device 5 with the devices 6, 7, and 8 may be performed. Then the channel designation by the central device for each device may result in: a channel 1, a channel 2, and a channel 3 are designated for data transmission between the device 1 and the devices 2, 3, and 4, respectively; a channel 4, a channel 5, and a channel 6 are designated for data transmission between the device 5 and the devices 6, 7, and 8, respectively. It is ensured that the data transmission between the multiple devices does not interfere with each other, and the communication quality is higher. The aforementioned device 1 may be provided with a first chip, and each of the devices 2, 3, and 4 may be provided with a second chip. The central device may send a designation result for the device 1 to the first chip, so that device 1 may follow the received designation result to determine which channels should be used for data transmission with devices 2, 3, and 4. In a specific implementation, the device 1 itself may also have the function of a central device, that is, the device 1 may also serve as a central device. In this case, the device 1 may directly determine which channels should be used for data transmission with the devices 2, 3, and 4.

In a specific implementation, if the non-standard working mode includes only the first working mode, that is, when there is no extension channel, if the first chip and the second chip work in the first working mode, the first fixed channel is set to be in a "enable" (allowed-to-use) state, and others among the standard channels except the first fixed channel are set to be in a "disable" (prohibited-to-use) state. For example, forty standard channels may be represented by 5 Byte (40 bit) 0xFFFFFFFFFF with 0 indicating that the channel is in the disable state and 1 indicating that the channel is in the enable state.

For ease of understanding of the second, third, and fourth working modes, the following first describes the extension channels involved in these three working modes: the extension channels are obtained by dividing the extended extension frequency band, and the extension frequency band may include at least one other frequency band out of the 2.4 G ISM frequency band.

In an example, the extended extension frequency band may include: a first frequency band and a second frequency band. The standard frequency band based on the standard Bluetooth protocol has an upper limit frequency and a lower limit frequency. The frequencies in the first frequency band are all less than the lower limit frequency, and the frequencies in the second frequency band are all greater than the upper limit frequency. With the upper limit frequency as a baseline, the communication quality may get worse as the frequency becomes larger. With the lower limit frequency as the baseline, the communication quality may get worse as the frequency becomes smaller. Therefore, in order to extend the same number of channels, compared with the scheme extending only one frequency band, the scheme of expanding the first frequency band and the second frequency band is advantageous for increasing the number of expanded channels while maintaining the communication quality in a relatively balanced level.

For example, the standard frequency band specified by the standard Bluetooth protocol is [2400 Mhz, 2480 Mhz], the first frequency band is 2360 Mhz to 2400 Mhz, and the second frequency band is 2480 Mhz to 2520 Mhz. The first frequency band may be expressed as [2360 Mhz, 2400 Mhz), and the second frequency band may be expressed as (2480 Mhz, 2520 Mhz]. Assuming that each extension channel has a width of 2 Mhz, the first frequency band and the second frequency band extended based on this example may be divided into forty extension channels. If only one frequency band is extended, in order to obtain forty channels, only the frequency band [2320 Mhz, 2400 Mhz), or only the frequency band (2480 Mhz, 2560 Mhz] is extended. It can be seen that in order to extend forty channels, compared with the way of only extending one frequency band, the way of extending two frequency bands in this example is advantageous for increasing the number of expanded channels while maintaining the communication quality in a relatively balanced level.

In another example, the extension frequency band extended according to actual needs may also include only the first frequency band or only the second frequency band, which is adaptable to individual requirements in practical applications.

In a specific implementation, each of the standard channels and each of the extension channels may be set with a channel number.

In an example, in related technologies, channel numbers of the standard channels are usually from 0 to 39, and the relationship between the channel number and the frequency may be expressed by the following formula: $f=2402+K*2$; wherein f denotes a frequency (unit: Mhz), K denotes a channel number, and $K=0\sim39$. In this embodiment, extension channels are extended and may be numbered on the basis of the channel numbers of the existing forty standard channels. The numbering rule may be: channel numbers of the extension channels obtained by dividing the first frequency band are sequentially decreased based on the initial number as the frequency decreases; for example, the channels less than 2400 Mhz have negative channel numbers, which are $-1\sim-20$ in sequence. Similarly, channel numbers of the extension channels obtained by dividing the second frequency band are sequentially increased based on the end number as the frequency increases; for example, the channel numbers of the extension channels greater than 2400 Mhz start after 39 and continue to increase, i.e., are 40~59 in sequence. That is, the relationship between the channel number and the frequency may be expressed by the following formula: $f=2402+K*2$; wherein f denotes a frequency (unit: Mhz), K denotes a channel number, and $K=-20\sim59$. For example, the relationship between the channel number of the standard channel and the frequency of the standard band, and the relationship between the channel number of the extension channel and the frequency of the extension frequency band may be shown in Table 1 below:

TABLE 1

| Name of Frequency Band | Frequency Range | Channel No. |
|---|---|---|
| First Frequency Band (Low band) | 2360 Mhz~2400 Mhz | −20~−1 |
| Standard Frequency Band (BLE band) | 2402 Mhz~2480 Mhz | 0~39 |
| Second Frequency Band (High band) | 2480 Mhz~2520 Mhz | 40~59 |

In the above example, considering that the standard channels in the related art already have consecutive channel numbers, in the embodiments of the present disclosure, the channel number of the standard channels and the extension channels may be made consecutive without renumbering the standard channels, which is convenient to adapting to the existing standard for channel numbering and improves operation efficiency and speed, that is, the channels after frequency hopping may be determined more quickly, thereby increasing the speed of data transmission between chips. Moreover, since the existing adaptive frequency hopping algorithm is performed under the condition of continuous numbering, the continuous numbering of the extension channels and the standard channels in the present disclosure is adaptable to the existing adaptive frequency hopping algorithm. Herein, the existing adaptive frequency hopping algorithm may be the Channel Selection algorithm #1 or the Channel Selection algorithm #2 specified in the Bluetooth core protocol Core_v5.2.

In another example, the standard channels may be renumbered, that is, both the standard channels and the extension channels are numbered. For example, the frequency range of the channels is 2360 Mhz-2520 Mhz, a total of 160 Mhz, divided into eighty channels with channel numbers of 0~79. That is, the relationship between the channel number and frequency may be expressed by the following formula: f=2362+K*2; wherein, f denotes a frequency (unit: Mhz), K denotes a channel number, and K=0~79. In this case, considering that the channels within 2402 Mhz-2480 Mhz in the related technology have been numbered with 0~39, in order to avoid conflicts, a correspondence relationship may be set: among the channels numbered 0~79, channels numbered with 20~59 are actually the channels within 2402 Mhz-2480 Mhz numbered with 0~39 in the related technology.

The second, third, and fourth working modes related to the extension channels are described below:

In the second working mode, the first chip and the second chip transmit data by frequency hopping among the extended extension channels. For example, the extension channels are the channels numbered with −1~−20 and 40~59, that is, the channel for data transmission between the first chip and the second chip within a preset period of time is altered among the channels numbered with −1~−20 and 40~59.

The applicable scenarios of the second working mode may include, but are not limited to: the scenario where it is necessary to avoid the known interference of the ISM frequency band, and there are multiple different networks within a preset region. In this scenario, if the first chip and the second chip work in the second working mode, it is helpful to avoid the interference of the ISM frequency band, thereby improving stability of the data transmission. Herein, the preset region may be set according to actual needs, such as within 5 meters or within a room.

In a specific implementation, if the first chip and the second chip work in the second working mode, since the standard Bluetooth protocol is compatible in this embodiment, that is, the extension channels and the standard channels exist at the same time, in the second working mode, the standard channels may be set to be in a disable state. For example, the aforementioned eighty channels numbered with −20~59 may be represented by 10 Byte (80 bit) 0xFFFFFFFFFFFFFFFFFFFF, the forty standard channels numbered with 0~39 is set to be in the disable state, and the forty extension channels numbered with −20~−1 and 40~59 is set to be in the enable state.

In the third working mode, the first chip and the second chip transmit data in a designated second fixed channel, and the second fixed channel is one of the extension channels, such as one of the channels numbered with −1~−20 and channels numbered with 40~59. The data transmission in the designated second fixed channel may be understood as the first chip and the second chip transmit data in the second fixed channel for a preset period of time, that is, the channel for data transmission shall not be altered in the preset period of time.

The applicable scenarios of the third working mode may include, but are not limited to: the scenario where it is necessary to avoid the known interference of the ISM frequency band, and there is merely one network within a preset region. In this scenario, if the first chip and the second chip work in the third working mode, it is helpful to avoid the interference of the ISM frequency band, thereby improving stability of the data transmission. Moreover, since the data is transmitted in the designated second fixed channel, it is also advantageous for improving the efficiency of data transmission.

In a specific implementation, if the first chip and the second chip work in the third working mode, the second fixed channel is set to be in the enable state, and other channels among the extension channels except the second fixed channel is set to be in the disable state. It should be appreciated that, since the standard Bluetooth protocol is compatible in this embodiment, that is, the standard channels and the extension channels exist at the same time, the standard channels in the third working mode is also set to be in the disable state. For example, the above eighty channels numbered with −20~59 may be represented by 10 Byte (80 bit) 0xFFFFFFFFFFFFFFFFFFFF, with 0 indicating that the channel is in the disable state, and 1 indicating that the channel is in the enable state.

The way of designating the second fixed channel is similar to that of the first fixed channel mentioned above. The difference is that the second fixed channel is designated among the extension channels, and the first fixed channel is designated among standard channels. To avoid repetition, the way of designating the second fixed channel will not be described here.

It should be appreciated that the first working mode and the third working mode is common in that they both support data transmission of the first chip and the second chip in a designated fixed channel. In the existing technology, data transmission between two parties are performed with adaptive frequency hopping among forty standard channels without designing a fixed channel. If multiple devices that need to perform data transmission hop to the same channel at the same time during the adaptive frequency hopping among the forty standard channels, the data transmission between devices may be interfered and efficiency of the data transmission may be affected. In this embodiment, data transmission between two parties are performed in the first working mode or the third working mode, and different channels may be designated for different devices, so that multiple devices may transmit data according to the respective designated fixed channels, that is, it is known to both parties in communication which channel should be used for transmission, which prevents multiple devices from hopping to the same channel during adaptive frequency hopping, thereby avoiding transmission interference between multiple devices, and improving efficiency of the data transmission.

In the fourth working mode, the first chip and the second chip transmit data by frequency hopping among the standard channels based on the standard Bluetooth protocol and the extended extension channels. In an example, it can be seen from Table 1 that the frequency range of the channels is 2360 Mhz~2520 Mhz, a total of 160 Mhz, divided into eighty channels, and the channel numbers are −20~59. In the fourth working mode, data transmission between the first chip and the second chip may be performed by frequency hopping among the eighty channels numbered with −20~59, that is, channel for data transmission between the first chip and the second chip is altered among the channels numbered with −20~59 in the preset period of time.

The applicable scenarios of the fourth working mode may include, but are not limited to: a scenario that is covered with a high density of Bluetooth low energy networks. In the existing technology, in the scenario that is covered with a high density of Bluetooth low energy networks, data transmission between multiple devices is performed by adaptive frequency hopping among forty channels, resulting in high load of data transmission on each channel. In this embodiment, multiple devices are enable to transmit data by adaptive frequency hopping among more than forty channels (such as the aforementioned eighty channels), and the load of data transmission on the forty channels is shared in more channels, such as eighty channels, which is helpful to alleviate the load of data transmission on each channel, thereby improving stability of the data transmission to a certain extent, and also supporting more devices for data transmission in the same network topology. In addition, compared to the exist technology with adaptive frequency hopping among forty channels, the addition of extension channels in this embodiment is advantageous for increasing the concurrent capacity for network communication, and meets the requirements for data transmission between more devices in the same network topology.

In a specific implementation, when the first chip and the second chip work in the fourth working mode, for example, data transmission is performed by adaptive frequency hopping among eighty channels numbered with −20~59, and the eighty channels are all set to be in the enable state.

It should be appreciated that the second working mode and the fourth working mode is common in that they are both a frequency hopping working mode, and the difference therebetween is in the range of channels for the frequency hopping. In an example, in the second working mode or the fourth working mode, the channel after frequency hopping is determined by the steps as follows, as shown in FIG. 1.

In step 101, a step value for frequency hopping is determined according to an access address allocated by the first chip to the second chip.

In step 102, a channel after frequency hopping is determined according to the step value and a total amount of channels.

Herein, the total amount of channels is a sum of an amount of standard channels and an amount of extension channels. It should be appreciated that during data transmission by adaptive frequency hopping, both the first chip and the second chip determine the channel after frequency hopping. Therefore, the aforementioned steps 101 to 102 are steps that are executed by both the first chip and the second chip during adaptive frequency hopping. The process in which the first chip determines the channel after frequency hopping is described below.

After the Bluetooth connection between the first chip and the second chip is established, the first chip allocates an access address to the second chip, and both the first chip and the second chip may store the access address. The first chip determines a channel identifier according to the access address. The first chip determines a current connection event counter, and then determines the step value for frequency hopping according to the channel identifier and the connection event counter. The first chip performs a modulo operation, namely "A mod B", on the step value "A" for frequency hopping and the total amount "B" of channels supported in the frequency hopping working mode, and determines the channel after frequency hopping according to a result of the modulo operation.

In an example, it is assumed that the total amount of channels is eighty. For ease of further understanding of the above process, reference may be made to FIG. 2, which is a block diagram for determining a channel number of the channel after frequency hopping. Herein, after the channel identifier and the connection event counter are input to a pseudo random number generator, the pseudo random number generator outputs the step value for frequency hopping, and then a channel number of an unmapped channel is obtained by performing modulo operation on the step value for frequency hopping and the total amount of channels (which is assumed to be eighty in this example). If the unmapped channel is in the enable state, the unmapped channel is determined as the channel after frequency hopping; or if the unmapped channel is in the disable state, then channels in the enable state are further mapped to obtain the channel after frequency hopping.

It should be noted that the aforementioned process of adaptive frequency hopping may be considered as a further improvement of the Channel Selection algorithm #2 specified in the Bluetooth core protocol Core_v5.2. The improvement lies in that mod 37, used in the Channel Selection algorithm #2, is updated to mod 80, so that the output result falls in the range of 0~79 (corresponding to channels numbered with −20~59).

Figure 2:
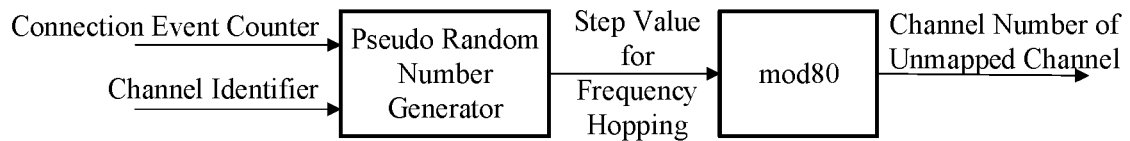
FIG. 2 is a block diagram of determining a channel number of the channel after frequency hopping according to an embodiment of the present disclosure.

It should be noted that the aforementioned process of frequency hopping is merely exemplified in the manner shown in FIG. 1 and FIG. 2, and is not limited thereto in specific implementation. For example, the Channel Selection algorithm #1 specified in the Bluetooth core protocol Core_v5.2 may be further improved, for example, mod 37 used in the Channel Selection algorithm #1 may be updated to mod 80.

Figure 3:
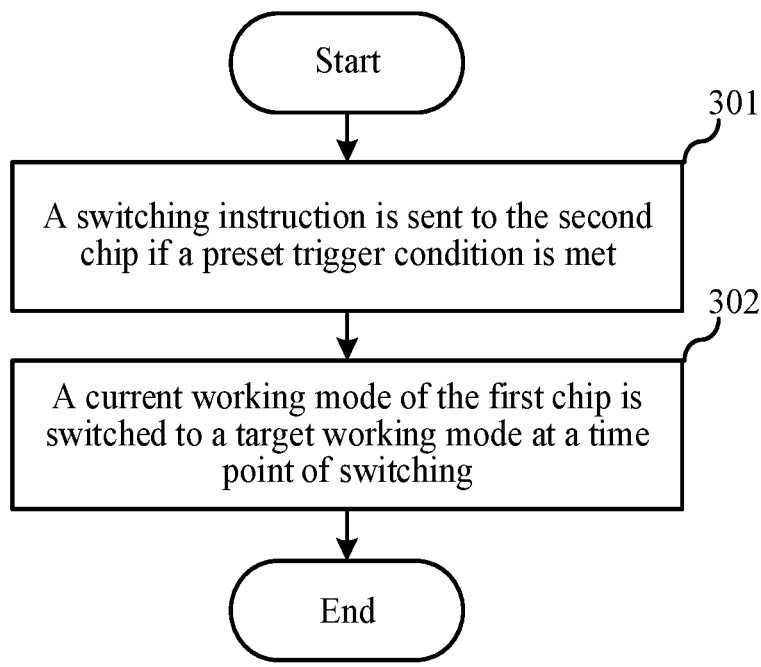
FIG. 3 is a flowchart of a data transmission method when a first chip is a chip sending a switching instruction according to an embodiment of the present disclosure.

In an example, the first chip is a chip that sends a switching instruction, and the second chip is a chip that receives the switching instruction. A flowchart of the data transmission method applicable to the first chip may refer to FIG. 3, including the following steps.

In step 301, a switching instruction is sent to the second chip if a preset trigger condition is met.

In step 302, a current working mode of the first chip is switched to a target working mode at a time point of switching.

Herein, the switching instruction carries the time point of switching and the target working mode, and is used to instruct the second chip to switch a current working mode of the second chip to the target working mode at the time point of switching. That is to say, the first chip and the second chip switch their respective current working modes to the target working mode at the same time point of switching.

Figure 4:
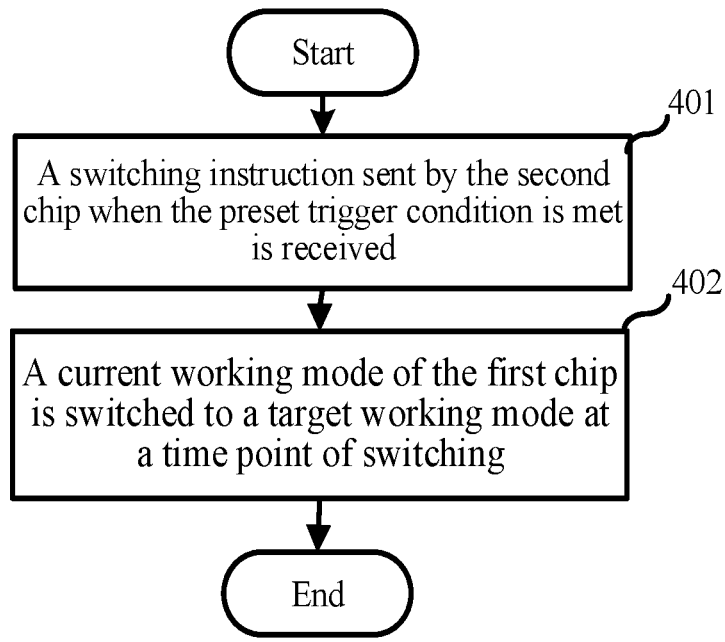
FIG. 4 is a flowchart of a data transmission method when the first chip is a chip receiving a switching instruction according to an embodiment of the present disclosure.

In another example, the first chip is a chip that receives a switching instruction, and the second chip is a chip that sends the switching instruction. A flowchart of the data transmission method applicable to the first chip may refer to FIG. 4, including the following steps.

In step 401, a switching instruction sent by the second chip when a preset trigger condition is met is received.

In step 402, a current working mode of the first chip is switched to a target working mode at a time point of switching.

Herein, the switching instruction carries the time point of switching and the target working mode, and the second chip switches the current working mode of the second chip to the target working mode at the time point of switching.

The current working mode and target working mode mentioned in step 302 and step 402 are two different working modes among the standard and non-standard working modes. For example, the working modes supported by the first chip and the second chip include the standard working mode and the four non-standard working modes mentioned above, that is, a total of five working modes are supported, then the current working mode and the target working mode are any two of the five working modes.

In one example, one of the two different working modes is the standard working mode. That is, either the current working mode or the target working mode is the standard working mode, that is, the first chip and the second chip may switch between the standard working mode and the non-standard working mode. Taking into account that most of the manufacturers' chips support the standard working mode, this switching method is widely applicable to more manufacturers' chips.

In an example, the current working mode is the standard working mode, and the target working mode is any one of the aforementioned first, second, third, and fourth working modes. The target working mode may be specifically determined according to the actual scenarios in which the first chip and the second chip work and the aforementioned applicable scenarios of the four non-standard working modes. For example, if the actual scenario in which the first chip and the second chip work is a scenario that is covered with a high density of Bluetooth low energy networks, the target working mode is the fourth working mode.

In another example, the current working mode is any one of the four non-standard working modes, and the target working mode is the standard working mode. In other words, the working modes of the first chip and the second chip may be switched between the standard working mode and the non-standard working mode.

In this embodiment, in addition to supporting the standard Bluetooth protocol, the first chip and the second chip also support a newly-added link control protocol, that is, a customized private protocol that the aforementioned non-standard working mode is based on. The first chip may send the switching instruction to the second chip based on the newly added link control protocol, and the switching instruction may be a data packet in form of a protocol data unit (PDU), "PDU data packets" hereafter.

In an example, fields of the foregoing PDU data packet may include: an operation code (OPcode), a time point of switching (instant), a sequence number of a target working mode (Mode), and a channel number of a designated channel (Ch). The aforementioned fields are described in detail below.

Operation code (OPcode) is used to describe a part of machine code that specifies a certain operation to be performed in a machine language instruction. A value of OPcode in this embodiment is used to indicate that the PDU data packet is a switching instruction. Herein, the value of OPcode may be selected from values that have not been used in the standard Bluetooth protocol to avoid conflicts with other existing instructions in the standard Bluetooth protocol. For example, the value of OPcode in this embodiment may be set to OXDF. It should be appreciated that the second chip may receive a good deal of PDU data packets. If the second chip recognizes that the value of OPcode is OXDF in one PDU data packet, it may be determined that the PDU data packet is actually a switching instruction.

Time point of switching (instant) is used to indicate a time point at which the first chip and the second chip should switch the working mode together. The time point of switching is usually set to "evt cnt"-plus-"n", wherein "evt cnt" is a count value of times of communication in current. In a moment when a communication connection is just established, the count value of times of communication in current is 0; and "n" may be set by those skilled in the art according to actual needs, for example, "n" may be have a value of 6. In a specific implementation, those skilled in the art may set a value of "n" based on the API provided externally for the first chip and the second chip. It should be appreciated that after the connection between the first chip and the second chip is established, the counter starts timing, and "evt cnt" is incremented by one after each communication interval duration which is predetermined as a fixed value. The "evt cnt"-plus-"n" may be understood as a time after the end of the nth communication interval duration in the future counted from the present.

For the sequence number of the target working mode (Mode), a value of Mode may be 0, 1, 2, 3, 4; wherein, 0 indicates the standard working mode (referred to as mode 0), 1 indicates the first working mode (referred to as mode 1), 2 indicates the second working mode (referred to as mode 2), 3 indicates the third working mode (referred to as mode 3), and 4 indicates the fourth working mode (referred to as mode 4).

For the channel number of a designated channel (Ch), when the target working mode is the first working mode, Ch is a channel number of the first fixed channel; when the target working mode is the third working mode, Ch is a number of the second fixed channel. That is, if the target working mode is the first working mode, the switching instruction further carries the number of the first fixed channel; if the target working mode is the third working mode, the switching instruction further carries the number of the second fixed channel.

In an example, if the working modes of the first chip and the second chip do not include the first working mode or the third working mode, the fields of the PDU data packet may not include the channel number of a designated channel (Ch), which is reduces data amount of the PDU data packet and improves transmission efficiency of the PDU data packet (i.e., the switching instruction). However, in a specific implementation, if the working modes of the first chip and the second chip do not include the first working mode or the third working mode, the fields of the aforementioned PDU data packet may alternatively include the aforementioned channel number of a designated channel (Ch). In this case, a field value of the channel number of a designated channel (Ch) may be ignored, that is, regardless of the field value of the channel number of a designated channel number (Ch), the chip that receives the PDU packet ignores the field value. In this case, even if the first working mode or the third working mode are added to the working modes of the first chip and the second chip according to actual needs, there is no need to add a field in the PDU data packet, which is convenient for adding further working modes of the first chip and the second chip.

In an example, the first chip and the second chip include five working modes, namely mode 0, mode 1, mode 2, mode 3, and mode 4. The PDU data packet include the aforementioned four fields. When the target working mode is mode 0, mode 2 or mode 4, the chip that receives the PDU data packet may ignore the field value of the channel number of the designated channel (Ch).

In a specific implementation, the switching of the working mode of the first chip and the second chip may include: switching between mode 0 and mode 1, switching between mode 0 and mode 2, switching between mode 0 and mode 3, and switching between mode 0 and mode 4. That is, switching between the standard working mode and one of the non-standard working modes, which enable the first chip and the second chip to be compatible with the standard Bluetooth protocol and meanwhile meet the requirements for data transmission in different scenarios.

Optionally, according to actual needs, the first chip and the second chip may also be switched between different non-standard working modes.

In an example, the non-standard working mode includes at least any one or more of the second, third, and fourth working modes, that is, the extension channels and the standard channels exist at the same time. For example, as will be discussed hereinafter, the output frequency supported in the first chip and the second chip is in a range of 2360 Mhz~2520 Mhz, which is divided into channels numbered with −20~59.

In an example, the target working mode is mode 0, and the first chip and the second chip switch the current working mode to mode 0, which may be understood as: the first chip and the second chip simultaneously, at a time point of switching, set the channels numbered with 0~36 to be in the enable state and set the remaining channels numbered −20~−1 and 37~59 to be in the disable state. Since, as specified in the existing standard Bluetooth protocol, three channels numbered with 37~39 are used for broadcasting, other channels numbered with 0~36 may be set to be in the enable state during data transmission. Data transmission between the first chip and the second chip by adaptive frequency hopping among the channels numbered with 0~36 may be started from the time point of switching.

In an example, the target working mode is mode 1, a channel number of the first fixed channel is 20, and the first chip and the second chip switch the current working mode to mode 1, which may be understood as: the first chip and the second chip simultaneously, at a time point of switching, set the channel numbered with 20 to be in the enable state and set the remaining channels numbered with −20~19 and 21~59 to be in the disable state. Data transmission between the first chip and the second chip in the channel numbered with 20 may be started from the time point of switching.

In an example, the target working mode is mode 2, and the first chip and the second chip switch the current working mode to mode 2, which may be understood as: the first chip and the second chip simultaneously, at a time point of switching, set the channels numbered with −20~−1 and 40~59 to be in the enable state and set the remaining channels numbered with 0~39 to be in the disable state. Data transmission between the first chip and the second chip by adaptive frequency hopping among the channels numbered with −20~−1 and 40~59 may be started from the time point of switching.

In an example, the target working mode is mode 4, and the first chip and the second chip switch the current working mode to mode 4, which may be understood as: the first chip and the second chip simultaneously, at a time point of switching, set the channels with numbered −20~59 to be in the enable state. Data transmission between the first chip and the second chip by adaptive frequency hopping among the channels numbered with −20~59 may be started from the time point of switching.

Figure 5:
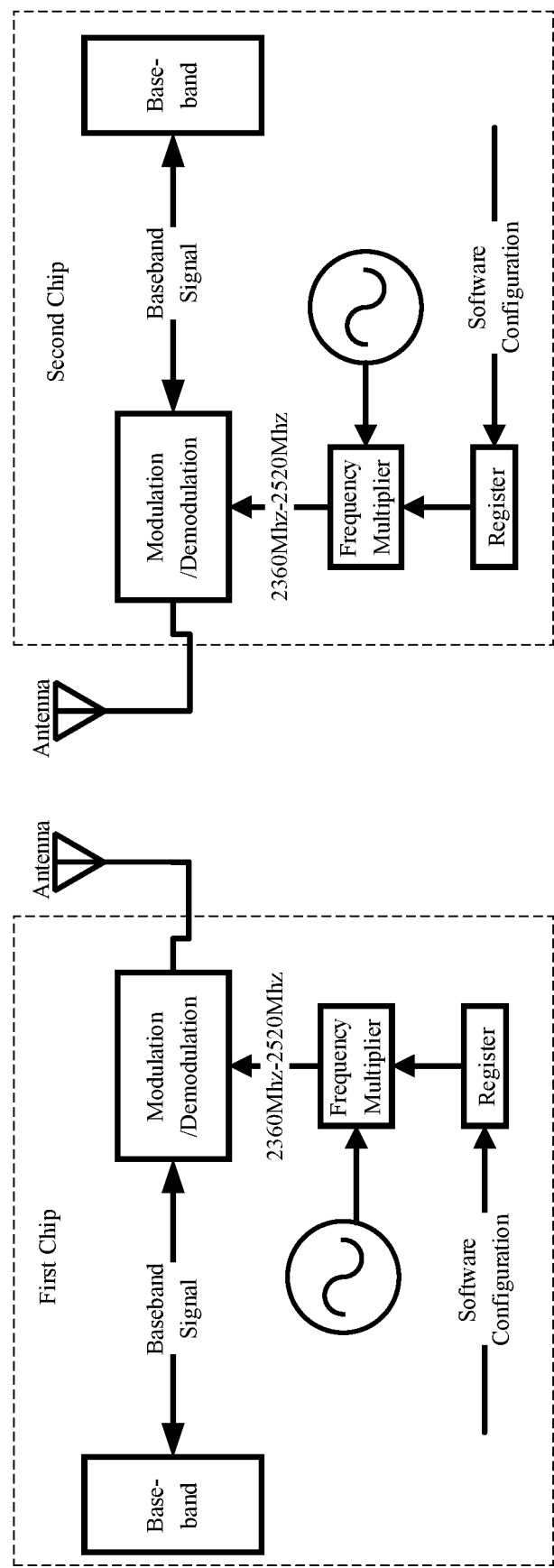
FIG. 5 is a schematic diagram of data transmission between the first chip and the second chip according to an embodiment of the present disclosure.

In an example, a schematic diagram of data transmission between the first chip and the second chip may be referred to FIG. 5. It is assumed that the first chip is provided in the master device, the second chip is provided in the slave device, frequency multipliers in the first chip and the second chip each has an output frequency in a range of 2360 Mhz~2520 Mhz. The output frequency of the frequency multipliers may be set by configuring a register. The register is configured through a software to enable the frequency multiplier to output any frequency between 2360 Mhz~2520 Mhz. For example, if it is determined that the first chip and the second chip are about to transmit data in the channel numbered with 20 which has a corresponding frequency of f=2402+20*2=2442 Mhz, the frequency multiplier may be controlled to output 2442 Mhz by configuring the register through the software. After the first chip performs a modulation operation on a baseband signal to be sent, the baseband signal is modulated to 2442 Mhz, an antenna of the master device transmits the modulated signal into the air. After an antenna of the slave device receives the signal, the second chip performs a demodulation operation, which corresponds to the modulation operation performed by the first chip, on the signal, so as to restore the received signal to the baseband signal that the first chip needs to send.

In an example, the preset trigger condition may be that the first chip receives a preset trigger message. Herein, the preset trigger message may be set according to actual needs. The trigger message may carry the time point of switching and the target working mode. When the target working mode is mode 1, the trigger message may also carry the channel number of the designated channel. The aforementioned API may be called, the time point of switching and the target working mode may be customized according to actual needs, and the customized time point of switching and the customized target working mode may be carried by the trigger message and send to the first chip.

Optionally, the trigger message may be key information, touch information, etc. The following takes key information as an example for description. For example, the first chip is provided in the main device, and the key information received by the first chip may be triggered by a key provided on the main device. For another example, the key information received by the first chip may also come from the slave device. When detecting that the key on the slave device is pressed, the slave device sends the key information to the first chip. Optionally, the key information received by the first chip may also come from a third-party device other than the master device and the slave device. When detecting that a key on the third-party device is pressed, the third-party device sends the key information to the first chip.

In an example, the preset trigger condition may be: the first chip detects that it is currently in a scenario that is covered with a high density of Bluetooth low energy networks. The method for the first chip detecting that it is currently in a scenario that is covered with a high density of Bluetooth low energy networks may be: the first chip detects that a duration in which the received signal strength indicator (RSSI) is greater than a preset strength threshold during a current communication process is greater than a preset duration threshold, and a packet loss rate within the preset duration threshold is greater than a preset packet loss rate threshold. Herein, the preset strength threshold, the preset duration threshold, and the preset packet loss rate threshold may be set according to actual needs, as long as indicating that the RSSI of the first chip has always been strong but packet loss has always occurred in the current communication process. Under this trigger condition, the target working mode is the fourth working mode suitable for the scenario that is covered with a high density of Bluetooth low energy networks.

It should be noted that the aforementioned examples in this embodiment are all illustrations for the convenience of understanding, and do not constitute any limitation to the technical solution of the present disclosure.

Some embodiments of the present disclosure provide a switchable working mode for the first chip and the second chip, which meets requirements for data transmission in different scenarios. Since the standard working mode is a working mode in which data is transmitted between the first chip and the second chip by frequency hopping among standard channels based on the standard Bluetooth protocol, that is, the first chip and the second chip are compatible with the existing standard Bluetooth protocol while supporting other non-standard working mode, it is advantageous for widening the scope of application of the first chip and the second chip while meeting requirements for data transmission in different scenarios, so that the first chip and the second chip are widely applicable.

Figure 6:
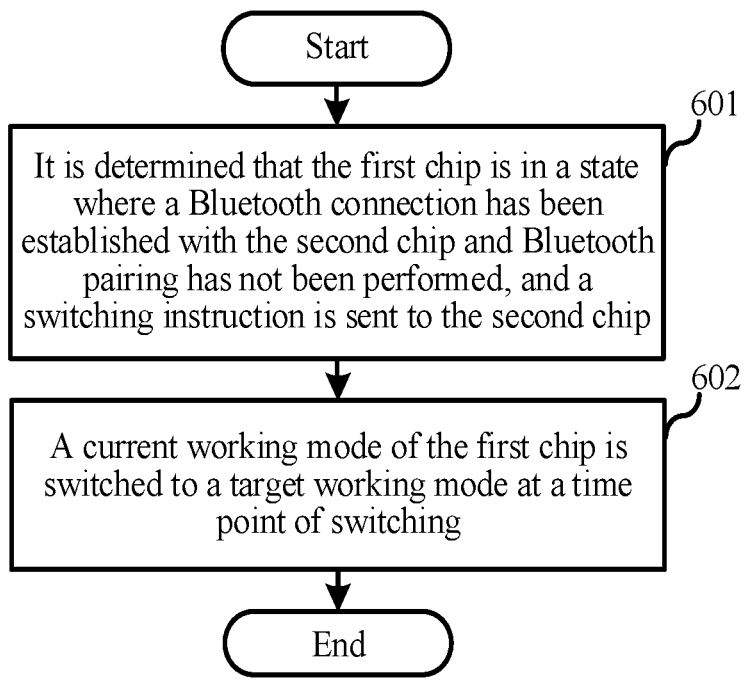
FIG. 6 is a flowchart of a data transmission method when the first chip is a chip sending a switching instruction in an example according to an embodiment of the present disclosure.

In an example, based on the above content, the first chip is a chip that sends a switching instruction, and the second chip is a chip that receives the switching instruction. The flowchart of the data transmission method applicable to the first chip may be as shown in FIG. 6, including the steps as follows.

In step 601, it is determined that the first chip is in a state where a Bluetooth connection has been established with the second chip and Bluetooth pairing has not been performed, and a switching instruction is sent to the second chip.

In step 602, a current working mode of the first chip is switched to a target working mode at a time point of switching.

Figure 7:
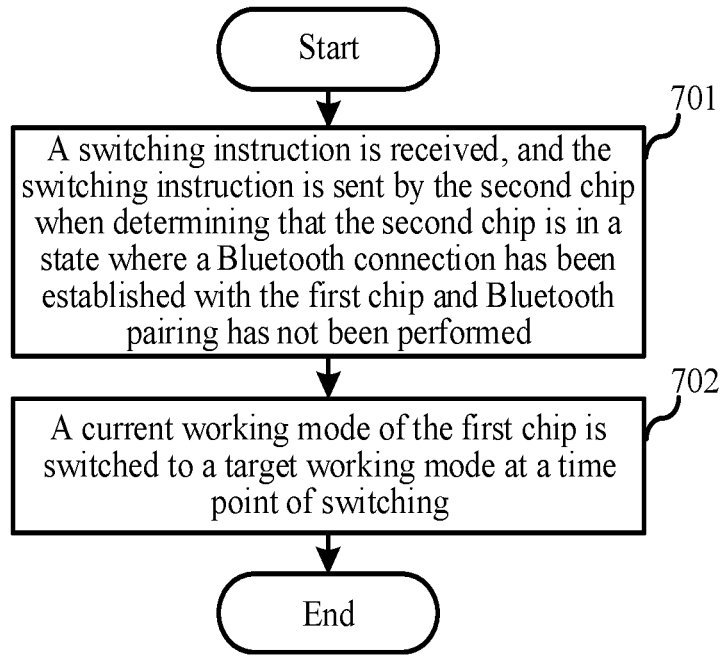
FIG. 7 is a flowchart of a data transmission method when the first chip is a chip receiving a switching instruction in another example according to an embodiment of the present disclosure.

In another example, based on the above content, the first chip is a chip that receives a switching instruction, and the second chip is a chip that sends the switching instruction. The flowchart of the data transmission method applicable to the first chip may be as shown in FIG. 7, including:

In step 701, a switching instruction is received, and the switching instruction is sent by the second chip when determining that the second chip is in a state where a Bluetooth connection has been established with the first chip and Bluetooth pairing has not been performed.

In step 702, a current working mode of the first chip is switched to a target working mode at a time point of switching.

Herein, the target working mode mentioned in step 602 and step 702 is the second working mode or the third working mode.

In step 601 and step 701, the Bluetooth connection established between the first chip and the second chip may be a Bluetooth low energy connection established based on the mode 0. Based on the existing standard Bluetooth protocol, after establishing the Bluetooth low energy connection, the first chip and the second chip enter a process of Bluetooth pairing, during which the pairing parties exchange secret keys. Since the standard Bluetooth protocol is supported in most of current listening devices, it is easy for them to monitor the standard frequency band specified by the standard Bluetooth protocol and thus steal the secret keys during the process of Bluetooth pairing. Therefore, in this embodiment, if the chip sending the switching instruction (the first chip or the second chip) determines that the first chip is in a state where a Bluetooth connection has been established with the second chip and Bluetooth pairing has not been performed, the chip sending the switching instruction sends the switching instruction to the chip receiving the switching instruction, which prevents the first chip and the second chip exchanging the secret keys based on the standard frequency band of the standard Bluetooth protocol during the process of Bluetooth pairing, and thus prevent the secret keys from being stolen.

In an example, it is determined that the first chip is in a state where a Bluetooth connection has been established with the second chip and Bluetooth pairing has not yet been performed, which may be understood as: the first chip has sent a security request to the second chip, but not yet received a pairing request sent by the second chip.

In another example, it is determined that the first chip is in a state where a Bluetooth connection has been established with the second chip and Bluetooth pairing has not been performed, which may also be understood as: the first chip has received a security request sent by the second chip, and not sent a pairing request to the second chip. In other words, after receiving the security request and before sending the pairing request, the first chip sends the switching instruction to the second chip, so that the first chip and the second chip may switch the current working mode to the target work mode at a reasonable time.

Taking the 80 channels in Table 1 after extension as an example, cases where the target working mode is the second working mode (mode 2) or the third working mode (mode 3) are described as follows, respectively.

When the target working mode is mode 2, the data transmission between the first chip and the second chip is performed in the first fixed channel, which means that the first chip and the second chip exchange secret keys in the first fixed channel for Bluetooth pairing, thereby preventing the secret keys from being exchanged in the channels numbered with 0~39 which are in the working frequency band of the standard Bluetooth protocol that may be monitored by the third-party monitoring device, and thus improving security during the process of pairing.

When the target working mode is mode 3, the first chip and the second chip exchange secret keys for Bluetooth pairing by adaptive frequency hopping among the extension channels. In this way, even in the manner of adaptive frequency hopping, exchange of the secret keys may keep away from the working frequency band of the standard Bluetooth protocol that may be monitored by the third-party device, so as to improve security during the process of pairing.

In an example, if the first chip is a chip that sends a switching instruction, after the first chip sends the switching instruction to the second chip, the method further includes: if determining that the first chip has completed the Bluetooth pairing with the second chip, the first chip sends a restoration instruction to the second chip, the restoration instruction carrying a time point of restoration; and the first chip restores the target working mode of the first chip to a previous working mode before switching at the time point of restoration. Herein, the restoration instruction is used to instruct the second chip to restore the target working mode of the second chip to the previous working mode before switching at the time point of restoration.

In another example, if the first chip is a chip that receives a switching instruction, after the first chip receives the switching instruction sent by the second chip when the preset trigger condition is met, the method further includes: the first chip receives a restoration instruction sent by the second chip when the second chip determines that the second chip has completed the Bluetooth pairing with the first chip, the restoration instruction carrying a time point of restoration; and the first chip restores the target working mode of the first chip to a previous working mode before switching at the time point of restoration. Herein, the second chip restores the target working mode of the second chip to the previous working mode before switching at the time point of restoration.

That is, in this embodiment, after the Bluetooth pairing is completed, the first chip and the second chip restore the current target working mode to the previous working mode before switching at the same time point of restoration. In one example, the previous working mode before switching is the standard working mode or the first working mode. The extension frequency band is not an ISM frequency band that is not needed to be authorized and is opened to the three main institutions of industry, science, and medicine by the International Telecommunications Union-Radio Communication Bureau, and long-term occupation of the extension frequency band may cause waste of resources. Therefore, after the pairing is completed, restoring to the standard working mode or the first working mode that does not occupy the extended frequency band may improve safety of the pairing and reduce the waste of resources. In another example, if one of the two different working modes, the target working mode and the current working mode mentioned in step 602 and step 702, is the standard working mode, the current working mode is the standard working mode, that is, the previous working mode before switching is the standard working mode.

In an example, the interaction process between the first chip and the second chip may refer to FIG. 8, including the steps as follows.

In step 801, a Bluetooth low energy connection is established between the first chip and the second chip based on mode 0.

In one example, the non-standard working mode only includes mode 1, that is, there is no extension channels. When the first chip and the second chip establish the Bluetooth low energy connection, channels numbered with 37~39 is set to be in the disable state, that is, the channels for broadcasting are set to be in the disable state, and channels numbered with 0~36 are all set to be in the enable state.

In another example, the non-standard working mode includes at least any one of mode 2, mode 3, and mode 4, that is, the standard channels and the extension channels exist at the same time. When the first chip and the second chip establish the Bluetooth low energy connection, channels numbered with −20~−1 and 37~59 are set to be in the disable state, that is, the channels for broadcasting and the extension channels are all set to be in the disable state, and channels numbered with 0~36 are all set to be in the enable state.

In step 802, a security request is initiated.

Herein, the security request may be initiated by the first chip or the second chip.

In step 803, a switching instruction is sent by the first chip to the second chip.

In a specific implementation, alternatively, the switching instruction may be sent by the second chip to the first chip.

In step 804, both the first chip and the second chip switch mode 0 to the target working mode at the same time point of switching.

Herein, the target working mode is mode 2 or mode 3.

In step 805, a pairing request is initiated, and pairing is performed based on Security Manager Protocol (SMP).

In step 806, the first chip and the second chip send a respective secret key to each other to complete exchange of secret keys.

Herein, the pairing based on SMP is in a manner of traditional pairing or secure connection. In step 805 and step 806, data transmission between the first chip and the second chip is performed based on mode 2 or mode 3, which can be understood as the data transmission being performed in other frequency bands out of the standard frequency band specified by the standard Bluetooth protocol. If the standard frequency band specified by the standard Bluetooth protocol is namely the in-BLE frequency band, the extension frequency band may be namely the out-of-BLE frequency band. In other words, the data transmission between the first chip and the second chip is performed in the out-of-BLE frequency band in step 805 and step 806.

In step 807, a restoration instruction is sent by the first chip to the second chip.

In step 808, both the first chip and the second chip restore the target working mode to mode 0 at the same time point of restoration.

That is to say, the first chip and the second chip are restored to the working mode based on the standard Bluetooth protocol after completing the exchange of secret keys.

Figure 8:
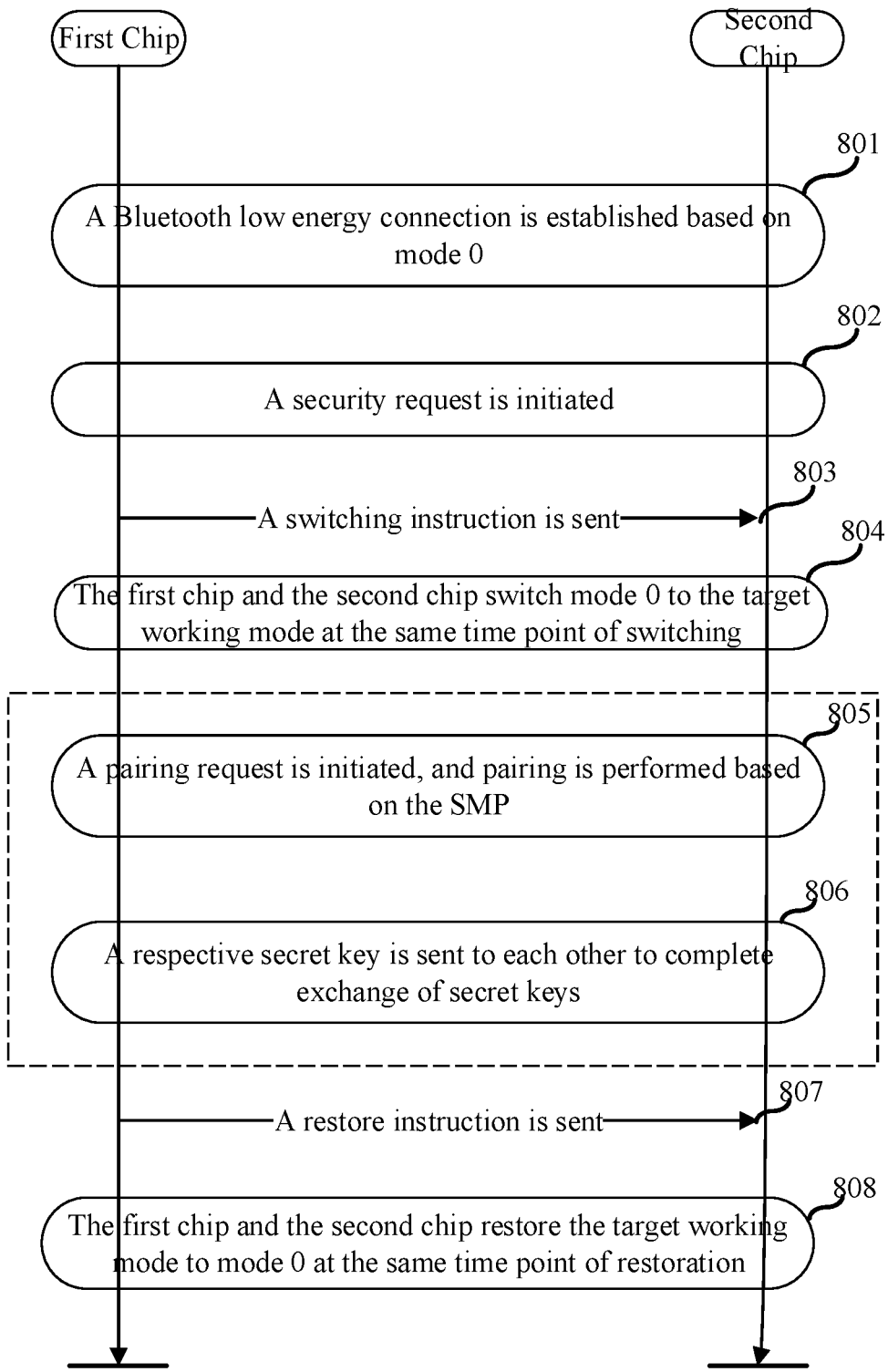
FIG. 8 is a flowchart of interaction between the first chip and the second chip according to an embodiment of the present disclosure.

It can be seen from FIG. 8 that, in this embodiment, compared with the existing process of Bluetooth pairing, the switching instruction and the restoration instruction are sent before and after pairing, respectively. Herein, both the switching instruction and the restoration instruction may be sent based on a newly added link control protocol (i.e., the customized private protocol mentioned above) in the present disclosure. By sending switching instruction and restoration instruction before pairing and after pairing, respectively, it is possible to improve security during the pairing while making the chips compatible with the existing working mode based on the standard Bluetooth protocol. The extension frequency band is not a frequency band specified by ISM, and long-term occupation of the extension frequency band may cause a waste of resources. Therefore, after the pairing is completed, restoring to the working mode based on the standard Bluetooth protocol may improve security during the pairing while reducing the waste of resources.

The division of the steps of the various methods discussed above is only for clarity of description. When implemented, some steps may be combined into one step or may be split into multiple steps as long as including the same logical relationship, which are all within the protection scope of the present disclosure. Addition of insignificant modifications or introducing insignificant design to the algorithm or process without changing the core design of the algorithm and process are all within the protection scope of the present disclosure.

Figure 9:
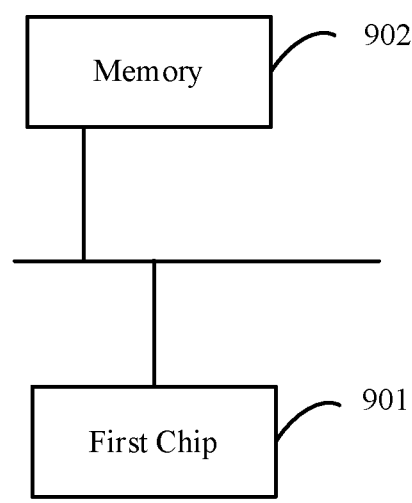
FIG. 9 is a schematic structural diagram of an electronic device according to an embodiment of the present disclosure.

Some embodiments of the present disclosure provide a first chip. As shown in FIG. 9, the first chip 901 is disposed within an electronic device and is connected to a memory 902 within the electronic device. The memory 902 stores instructions that are executable by the first chip 901. The instructions, when executed by the first chip 901, causes the first chip 901 to execute the aforementioned data transmission method applicable to the first chip.

The memory 902 and the first chip 901 are connected by a bus. The bus may include any number of interconnected buses and bridges. The bus connects one or more first chips 901 with various circuits of the memory 902. The bus may also connect various other circuits such as peripheral devices, voltage regulators, power management circuits, etc., which are all known in the art, and therefore, will not be further described herein. A bus interface provides an interface between the bus and the transceiver. The transceiver may be one element or multiple elements, such as multiple receivers and transmitters, serving as a unit for communication on the transmission medium with various other devices. The data processed by the first chip 901 is transmitted on the wireless medium through an antenna which further receives the data and transmits the data to the first chip 901.

The first chip 901 is responsible for managing the bus and general processing, and may also provide various functions, including timing, peripheral interfaces, voltage regulation, power management, and other control functions. The memory 902 may be used to store data used by the first chip 901 during operation.

Some embodiments of the present disclosure provide an electronic device, as shown in FIG. 9, including: a first chip 901 in the aforementioned embodiment, and a memory 902 connected to the first chip 901.

Some embodiments of the present disclosure provide a computer-readable storage medium that stores a computer program, when executed by a processor, causing the processor to implement the method in the aforementioned embodiments.

That is, those skilled in the art should appreciate that all or part of the steps in the method of the aforementioned embodiments may be implemented by instructing relevant hardware through a program. The program is stored in a storage medium and includes several instructions to enable a device (a single-chip microcomputer, a chip, etc.) or a processor to execute all or part of the steps of the method in various embodiments of the present disclosure. The aforementioned storage medium include: U disk, mobile hard disk, read-only memory (ROM), random access memory (RAM), magnetic disks or optical disks and other media capable of storing program codes.

Those skilled in the art should appreciate that the aforementioned embodiments are specific embodiments for realizing the present disclosure, and in actual applications, various changes can be made in form and details without departing from the spirit and range of the present disclosure.

What is claimed is:

1. A data transmission method, applicable to a first chip, the method comprising:
    performing data transmission with a second chip in a current working mode, wherein the current working mode is one of a standard working mode and a non-standard working mode; and
    switching a working mode of the first chip from the current working mode to a target working mode concurrently with a working mode of the second chip being switched from the current working mode to the target working mode, wherein the target working mode is different from the current working mode and is one of a standard working mode and a non-standard working mode;
    wherein the standard working mode is a working mode in which data is transmitted between the first chip and the second chip by frequency hopping among standard channels based on a standard Bluetooth protocol;
    wherein the non-standard working mode comprises at least one of:
    a first working mode in which data is transmitted between the first chip and the second chip in a designated first fixed channel, the first fixed channel being one of the standard channels;
    a second working mode in which data is transmitted between the first chip and the second chip by frequency hopping among extended extension channels;
    a third working mode in which data is transmitted between the first chip and the second chip in a designated second fixed channel, the second fixed channel being one of the extended extension channels; and
    a fourth working mode in which data is transmitted between the first chip and the second chip by frequency hopping among the standard channels based on the standard Bluetooth protocol and the extended extension channels.

2. The data transmission method according to claim 1, wherein switching the working mode of the first chip from the current working mode to the target working mode comprises:
    sending, by the first chip, a switching instruction to the second chip in response to determining that a preset trigger condition is met, or receiving, by the first chip, a switching instruction sent by the second chip when a preset trigger condition is met, the switching instruction being used to instruct the second chip or the first chip to switch from the current working mode to the target working mode at a time point of switching; and
    switching, by the first chip, the working mode of the first chip from the current working mode to the target working mode at the time point of switching;
    wherein the switching instruction carries the time point of switching and the target working mode, and the standard working mode is a working mode used in Bluetooth low energy technology.

3. The data transmission method according to claim 1, wherein one of the current working mode and the target working mode is the standard working mode.

4. The data transmission method according to claim 2, wherein the standard channels and the extension channels are numbered, and the non-standard working mode comprises at least one of the first working mode and the third working mode; and wherein:
    the switching instruction further carries a channel number of the first fixed channel when the target working mode is the first working mode;
    the switching instruction further carries a channel number of the second fixed channel when the target working mode is the third working mode.

5. The data transmission method according to claim 2, wherein the non-standard working mode comprises at least one of the second working mode and the third working mode, and the trigger condition comprises: it is determined that the first chip is in a state where a Bluetooth connection has been established with the second chip and Bluetooth pairing has not been performed;
    the target working mode is one of the second working mode and the third working mode.

6. The data transmission method according to claim 5, wherein in the state where the Bluetooth connection has been established with the second chip and the Bluetooth pairing has not been performed:
    a security request has been sent to the second chip, and a pairing request sent by the second chip has not yet been received; or,
    a security request sent by the second chip has been received, and a pairing request has not yet been sent to the second chip.

7. The data transmission method according to claim 5, wherein after sending the switching instruction to the second chip, the method further comprises:
    in response to determining that the Bluetooth pairing with the second chip is completed, sending, by the first chip, a restoration instruction to the second chip; wherein the restoration instruction carries a time point of restoration, and the restoration instruction is used to instruct the second chip to restore the target working mode of the second chip to a previous working mode before switching at the time point of restoration;

restoring, by the first chip, the target working mode of the first chip to the previous working mode before switching at the time point of restoration.

8. The data transmission method according to claim 5, wherein after receiving the switching instruction sent by the second chip when the preset trigger condition is met, the method further comprises:

receiving, by the first chip, a restoration instruction, wherein the restoration instruction is sent by the second chip when the second chip determines that the Bluetooth pairing with the first chip is completed, and the restoration instruction carries a time point of restoration;

restoring, by the first chip, the target working mode of the first chip to a previous working mode before switching at the time point of restoration;

wherein the second chip restores the target working mode of the second chip to the previous working mode before switching at the time point of restoration.

9. The data transmission method according to claim 2, wherein the non-standard working mode comprises the fourth working mode; and the trigger condition comprises: during the data transmission with the second chip, it is determined that a duration in which the received signal strength indicator is greater than a preset strength threshold is greater than a preset duration threshold, and a packet loss rate within the preset duration threshold is greater than a preset packet loss rate threshold;

the target working mode is the fourth working mode.

10. The data transmission method according to claim 1, wherein the non-standard working mode comprises at least one of the second working mode and the fourth working mode, and in the second working mode or the fourth working mode, a channel after frequency hopping is determined by:

determining a step value for frequency hopping according to an access address allocated by the first chip to the second chip;

determining a channel after frequency hopping according to the step value and a total amount of channels; wherein the total amount of channels is a sum of an amount of the standard channels and an amount of the extension channels.

11. The data transmission method according to claim 1, wherein the non-standard working mode comprises at least one of: the second working mode, the third working mode, and the fourth working mode; the standard channels are obtained by dividing a standard frequency band, and the extension channels are obtained by dividing an extended extension frequency band; the standard frequency band has an upper limit frequency and a lower limit frequency, and the extended frequency band comprises a first frequency band and a second frequency band, frequencies in the first frequency band are all less than the lower limit frequency, and frequencies in the second frequency band are all greater than the upper limit frequency.

12. The data transmission method according to claim 11, wherein the first frequency band is 2360 Mhz to 2400 Mhz, and the second frequency band is 2480 Mhz to 2520 Mhz.

13. The data transmission method according to claim 11, wherein the standard channels are numbered with continuous channel numbers comprising an initial number and an end number;

channel numbers of channels obtained by dividing the first frequency band are sequentially decreased based on the initial number as frequency decreases;

channel numbers of channels obtained by dividing the second frequency band are sequentially increased based on the end number as frequency increases.

14. The data transmission method according to claim 13, wherein the standard channels are numbered with 0~39 in sequence as frequency increases, and the channels obtained by dividing the first frequency band are numbered with −1~−20 in sequence as frequency decreases, and the channels obtained by dividing the second frequency band are numbered with 40~59 in sequence as frequency increases.

15. The data transmission method according to claim 1, wherein the non-standard working mode comprises at least one of the first working mode and the third working mode;

when the first chip works in the first working mode, the first fixed channel is set to be in an enable state and other channels of the standard channels except the first fixed channel are set to be in a disable state;

when the first chip works in the third working mode, the second fixed channel is set to be in an enable state, and other channels of the extension channels except the second fixed channel is set to be in a disable state.

16. The data transmission method according to claim 1, wherein:

the first chip is provided in a master device, and the second chip is provided in a slave device; or, the first chip is provided in the slave device, and the second chip is provided in the master device.

17. A first chip, wherein the first chip is disposed within an electronic device and is connected to a memory within the electronic device, the memory stores instructions executable by the first chip, and the instructions, when executed by the first chip, causes the first chip to implement a data transmission method, wherein the method comprises:

performing data transmission with a second chip in a current working mode, wherein the current working mode is one of a standard working mode and a non-standard working mode; and switching a working mode of the first chip from the current working mode to a target working mode concurrently with a working mode of the second chip being switched from the current working mode to the target working mode, wherein the target working mode is different from the current working mode and is one of a standard working mode and a non-standard working mode;

wherein the standard working mode is a working mode in which data is transmitted between the first chip and the second chip by frequency hopping among standard channels based on a standard Bluetooth protocol;

wherein the non-standard working mode comprises at least one of:

a first working mode in which data is transmitted between the first chip and the second chip in a designated first fixed channel, the first fixed channel being one of the standard channels;

a second working mode in which data is transmitted between the first chip and the second chip by frequency hopping among extended extension channels;

a third working mode in which data is transmitted between the first chip and the second chip in a designated second fixed channel, the second fixed channel being one of the extended extension channels; and a fourth working mode in which data is transmitted between the first chip and the second chip by frequency hopping among the standard channels based on the standard Bluetooth protocol and the extended extension channels.

18. An electronic device, comprising a first chip and a memory connected to the first chip, wherein the first chip is disposed within an electronic device and is connected to a memory within the electronic device, the memory stores instructions executable by the first chip, and the instructions, when executed by the first chip, causes the first chip to implement a data transmission method, wherein the method comprises:

performing data transmission with a second chip in a current working mode, wherein the current working mode is one of a standard working mode and a non-standard working mode; and switching a working mode of the first chip from the current working mode to a target working mode concurrently with a working mode of the second chip being switched from the current working mode to the target working mode, wherein the target working mode is different from the current working mode and is one of a standard working mode and a non-standard working mode;

wherein the standard working mode is a working mode in which data is transmitted between the first chip and the second chip by frequency hopping among standard channels based on a standard Bluetooth protocol;

wherein the non-standard working mode comprises at least one of:

a first working mode in which data is transmitted between the first chip and the second chip in a designated first fixed channel, the first fixed channel being one of the standard channels;

a second working mode in which data is transmitted between the first chip and the second chip by frequency hopping among extended extension channels;

a third working mode in which data is transmitted between the first chip and the second chip in a designated second fixed channel, the second fixed channel being one of the extended extension channels; and a fourth working mode in which data is transmitted between the first chip and the second chip by frequency hopping among the standard channels based on the standard Bluetooth protocol and the extended extension channels.

* * * * *